United States Patent
Amezquita-Semprun et al.

(10) Patent No.: US 12,264,924 B2
(45) Date of Patent: Apr. 1, 2025

(54) EFFECTIVE PATH PLANNING SYSTEMS AND METHODS FOR AUTONOMOUS VEHICLES

(71) Applicant: Moovita Pte Ltd, Singapore (SG)

(72) Inventors: Kendrick Amezquita-Semprun, Singapore (SG); Fu Keong Chia, Singapore (SG); Banghyon Lee, Singapore (SG); Anthony Wong, Singapore (SG); Wai Hong Tan, Singapore (SG)

(73) Assignee: MOOVITA PTE LTD, Singapore (SG)

( * ) Notice: Subject to any disclaimer, the term of this patent is extended or adjusted under 35 U.S.C. 154(b) by 205 days.

(21) Appl. No.: 17/973,493

(22) Filed: Oct. 25, 2022

(65) Prior Publication Data

US 2023/0127002 A1 Apr. 27, 2023

Related U.S. Application Data

(60) Provisional application No. 63/271,693, filed on Oct. 25, 2021.

(51) Int. Cl.
*G01C 21/34* (2006.01)
*B60W 60/00* (2020.01)

(52) U.S. Cl.
CPC ..... *G01C 21/3461* (2013.01); *B60W 60/0015* (2020.02); *B60W 2520/10* (2013.01); *B60W 2520/125* (2013.01); *B60W 2554/802* (2020.02)

(58) Field of Classification Search
CPC ........... G01C 21/3461; G01C 21/3407; B60W 60/0015; B60W 2520/10; B60W 2520/125; B60W 2554/802; B60W 60/0011
See application file for complete search history.

(56) References Cited

U.S. PATENT DOCUMENTS

| | | | |
|---|---|---|---|
| 2019/0187715 A1* | 6/2019 | Zhang | G05D 1/0268 |
| 2021/0020045 A1* | 1/2021 | Huang | G01C 21/3804 |
| 2021/0114617 A1* | 4/2021 | Phillips | B60W 30/0956 |
| 2021/0200212 A1* | 7/2021 | Urtasun | G05D 1/0214 |
| 2023/0041975 A1* | 2/2023 | Caldwell | B60W 60/0027 |
| 2023/0159056 A1* | 5/2023 | Cheng | B60W 30/0956 |
| | | | 701/301 |

* cited by examiner

*Primary Examiner* — Abby Y Lin
*Assistant Examiner* — Dylan M Katz
(74) *Attorney, Agent, or Firm* — HORIZON IP PTE LTD.

(57) ABSTRACT

A reactive path planner for vehicles is disclosed. The reactive path planner, based on a nominal path from A to B, generates alternative parallel paths which are displaced by a predefined lateral distance from the nominal path using constrained quintic polynomials. Constraints are imposed on the alternative paths to ensure safety and comfort based on dynamic and mechanical feasibilities of the vehicle. A cost function is applied to the nominal path and alternative paths select the path with the least cost. The reactive path planner achieves a complete path planning solution with high computational efficiency, even in highly cluttered and dynamic environments.

15 Claims, 9 Drawing Sheets

Input
 $P(s, d_f = 0)$ Nominal path
 $v_{ego}$ Velocity of ego vehicle    — 510

Output
 $P_{opt}$ Optimal path    — 520

Compute initial conditions $s = s_0$
for $d_{lat} = (-N, \ldots, -1, 0, 1, \ldots, N)$ do
 Generate frenet sub path $P(s, d_f = d_{lat})$
 Compute longitudinal goal $P(s = s_{min}, d_f = d_{lat})$
 Find coefficients $a_0, a_1, a_2, a_3, a_4, a_5$
 for $s_i = s_0, \ldots, s_f$ do
  Find $(x, y)$ for $P(s = s_i, d_f = d_{lat})$
  Check for collision at $(x, y)$
  if collision then
   break
  end if
 end for
 Compute $C(P(s, d_f = d_{lat})) = \lambda_1 C_1 + \ldots$
 if $C_{th} < C_{min}$ then
  $P_{opt} = P(s = s_i, d_f = d_{lat})$
  $C_{min} = C$
 end if
end for
return $P_{opt}$    — 530

| Method | Samples Generated | Time (ms) | Time Per Sample (ms) |
|---|---|---|---|
| RPP | 80 | 20 | 0.25 |
| SAA | 165 | 5870 | 35 |
| OPA | 100 | 66 | 0.66 |

| Weight | Description | Value |
|---|---|---|
| W1 | Mean curvature | 35.5 |
| W2 | Maximum curvature | 15 |
| W3 | Sigmoid (distance to obstacle) | 1750 |
| W4 | Lateral distance to previous optimum path | 15 |
| W5 | Time travelling along the path | 50 |
| W6 | Lateral acceleration, ego speed | 50 |
| W7 | Lateral distance to nominal path | 50 |

EFFECTIVE PATH PLANNING SYSTEMS AND METHODS FOR AUTONOMOUS VEHICLES

CROSS-REFERENCE TO RELATED APPLICATION

This application claims the benefit of U.S. Provisional Application Ser. No. 63/271,693, filed on Oct. 25, 2021, which is all herein incorporated by reference in its entirety for all purposes.

FIELD OF THE INVENTION

The present disclosure generally relates to autonomous vehicles. In particular, the disclosure relates to effective path planning for autonomous vehicles.

BACKGROUND

Advanced driver assistance systems have been employed to reduce accidents. Such advanced driver assistance systems include various safety features, such as informing the driver of the equipped vehicle (vehicle equipped with the advance driver assistance system) of oncoming vehicles, whether from the back, front and/or the rear of the equipped vehicle. The equipped vehicle may be an autonomous vehicle or driven by a driver.

When an autonomous vehicle (AV) is programmed to go to a destination from its current location, it initiates motion planning to determine a path or trajectory to the destination. For example, the AV includes an AV stack which includes various layers. One of the layers of the AV stack is the motion planning stack. The motion planning is responsible for providing paths or trajectories (path planning) for the control layer on a lower-level layer of the AV stack to drive the actual motion of the vehicle to the destination.

Path planning constraints may include that the paths are: collision-free paths to prevent any dangerous maneuver towards obstacles; dynamically and mechanically achievable by the capabilities of the vehicle; and stable to provide a comfortable experience for the passengers. These constraints are for ensuring the safety and comfort of passengers as well as other vehicles and road users to ensure a collision-free path or trajectory. A crucial feature of path planning is reactive maneuvering to facilitate this goal.

The solution for motion planning is commonly evaluated in terms of completeness as well as computation efficiency. A complete solution translates into a feasible path based on the previous conditions but does not guarantee global optimality. The computation efficiency relates to the capability of providing a complete solution in a finite or given time for path planning to be effective. For example, finding a complete solution cannot take hours or days, but within a fraction of a second.

Existing path planning techniques can be categorized as variational-based and sampling-based techniques. However, some of the current path planning techniques are ineffective in finding a complete solution within the given time. For example, some techniques may be incapable or ineffective in finding a complete solution while other techniques may exceed the allotted time to produce a complete solution.

From the foregoing discussion, there is a need for.

The present disclosure is directed to a path planner and path planning methods capable of producing a complete solution within the given allotted time.

SUMMARY

The disclosure, in one embodiment, relates to path planning system for a vehicle. The path planning system includes a reactive path planner module. The reactive path planner is based on constrained quintic polynomials. The reactive planner is configured to generate N alternative paths based on a nominal path from location A to location B. The N alternative paths are parallel paths to the nominal path and are displaced within a predefined lateral distance from the nominal path. A constrainer module constrains the alternative paths based on constrained quintic polynomials. The constraints ensure safety and comfort of the vehicle based on dynamic and mechanical capabilities of the vehicle. An evaluator module applies a cost function to the nominal path and alternative paths and selects one of the paths from the nominal path and alternative paths with a lowest cost from the cost function as an output path of the planning system.

In another embodiment, the disclosure is directed to a method for path planning in a vehicle. The method includes generating N alternative paths based on a nominal path from location A to location B. The N alternative paths are parallel paths to the nominal path and are displaced within a predefined lateral distance from the nominal path. Constraints are calculated for the alternative paths based on constrained quintic polynomials. The wherein constraints are based on the vehicle dynamic and mechanical capabilities. The nominal path and alternative paths are evaluated using a cost function. A path with a lowest cost according to the cost function is selected as an output path.

In yet another embodiment, the disclosure relates to path planning system for a vehicle. The path planning system includes a mission path planner for generating a nominal path from location A to location B. A reactive path planner module generates N alternative paths based on the nominal path. The N alternative paths are parallel paths to the nominal path and are displaced within a predefined lateral distance from the nominal path. A constrainer module constrains the alternative paths based on constrained quintic polynomials. The constraints ensure safety and comfort of the vehicle based on dynamic and mechanical capabilities of the vehicle. An evaluator module applies a cost function to the nominal path and alternative paths and selects one of the paths from the nominal path and alternative paths with a lowest cost from the cost function as an output path of the planning system.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, with emphasis instead generally being placed upon illustrating the principles of the invention. In the following description, various embodiments of the present invention are described with reference to the following drawings, in which.

DETAILED DESCRIPTION

Embodiments relate to path planning for autonomous vehicles (AVs). For example, a path planner is part of a motion planning layer in an autonomous vehicle (AV) stack responsible for providing paths or trajectories for the control layer of a lower-level layer to drive the actual motion of the vehicle. The path planner may be employed for use in manual, partial manual or fully autonomous mode. The path planner generates alternative paths which are based on a nominal path generated by a mission planning layer. Other configurations of the path planner may also be useful.

Figure 1A:
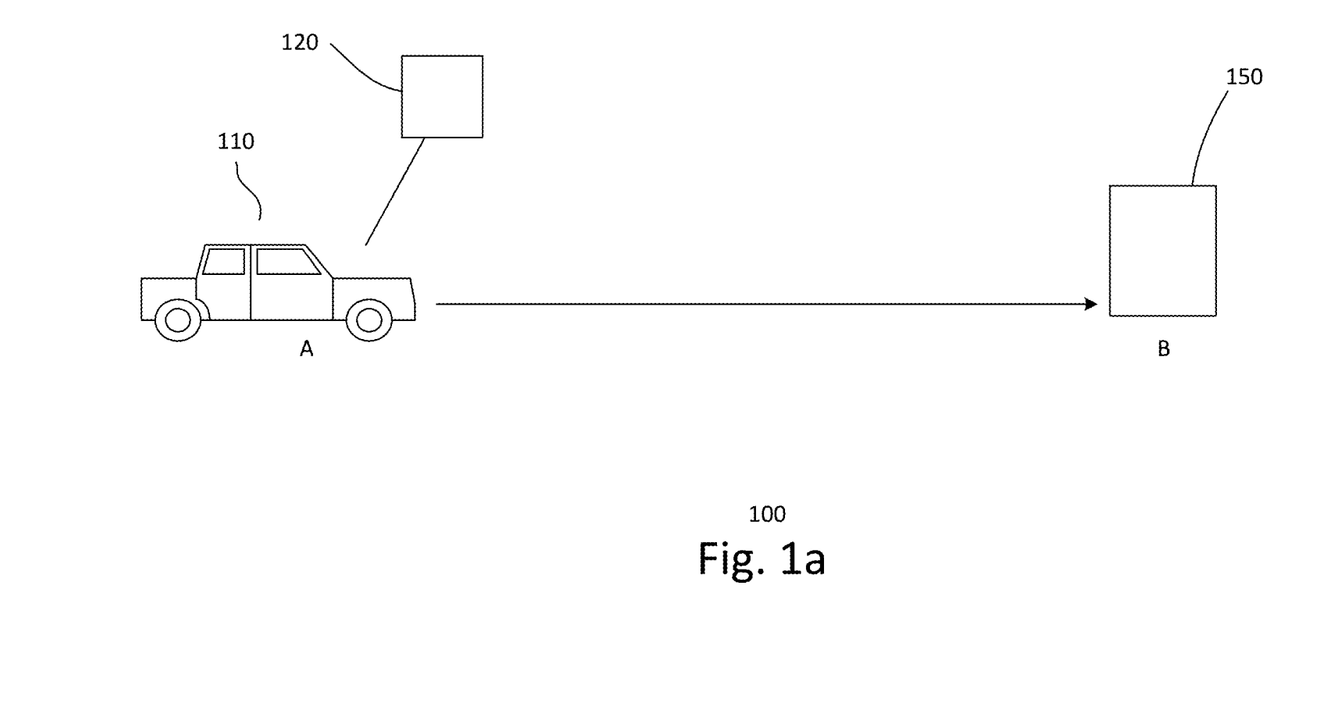
FIG. 1a illustrates an exemplary autonomous vehicle with a path planner.

FIG. 1a illustrates an exemplary scenario 100 of an autonomous vehicle with a path planner. For example, as shown, a vehicle 110 is at location A. Location A may be referred to as the "ego location", where ego is the AV. The vehicle, in one embodiment, is an AV with a path planner. The path planner may be part of an AV stack. The AV stack may be fully autonomous, such as level 4 or 5. Providing the path planner for a non-fully autonomous AV stack may also be useful, for example, such as level 3 or lower (e.g., advanced driver assist systems).

The user, for example, desires to go to a destination address 150, which may be a building at location B. The user may enter the address of location B into the path planner. Based on the current location of the vehicle and the destination address, the path planner generates a nominal path from location A (ego location) to location B based on map and GPS units. For example, a nominal path is generated based on the current GPS location of the vehicle and using the map to generate that path to location B.

The nominal path, in one embodiment, is generated by a mission path planner of the AV stack. The mission path planner, for example, is part of the strategic planning layer of the AV stack. This mission path planner generates the nominal path based on the current location of the vehicle and the destination address. The nominal path is generated assuming free space or environment. For example, the nominal path is generated based on assumption that there are no obstacles in the path, such as traffic, road construction or other hindrances. The nominal path generated is assumed to be dynamically and mechanically feasible. For example, the nominal path is generated assuming dynamic and mechanical feasibility in free space. The nominal path may be a list of points on the map between A and B.

In one embodiment, the AV stack includes a reactive path planner. The reactive path planner, in one embodiment, is implemented as part of the motion planner. The motion planner, for example, is part of the tactical planning layer of the AV stack. The reactive path planner is employed to generate alternative paths based on the nominal path. The tactical planning layer, for example, precedes the strategic planning layer. In one embodiment, the alternative paths are parallel paths which are based on a predefined lateral distance from the nominal path. For example, the alternative paths are parallel paths within the predefined lateral distance. Since the alternative paths are parallel to the nominal path, they are also assumed to be feasible paths.

As discussed, the alternative paths are parallel paths which are based on a predefined lateral distance from the nominal path. To generate the alternative paths, the nominal path is converted to Frenet-Serret (Frenet) coordinates. Converting the nominal path to Frenet coordinates parameterizes the lateral deviation of the alternative paths from the nominal path as we move along its arc length. The nominal path serves as a reference for the alternative paths with the predefined lateral deviation or distance. For theoretical and assumption purposes, the nominal path may be expressed as a polynomial function $P(x)$ over the distance traveled along the x-axis of the map coordinate system.

As discussed, the reactive path planner generates alternative paths which are parallel to the nominal path $P(x)$. The alternative paths, in one embodiment, are restricted to parallel paths which are within a predefined lateral distance of the nominal path $P(x)$ according to the Frenet coordinates. The predefined lateral distance, for example, may be about 20 feet. Other predefined lateral distances may also be useful. For example, the predefined later distance may be about 10-20 feet. The predefined lateral distance may be predefined by the reactive path planner. However, it is understood that the predefined lateral distance may be defined by the user. For example, a predefined setting may be provided for the path planner but can be overridden by the user. Other configurations for determining the predefined lateral distance may also be useful.

Based on the predefined lateral distance requirement, an initial set of alternative paths (initial alternative path set) is generated. The number of alternative paths generated depends on the number of paths within the predefined lateral distance. Typically, the number N of alternative sample paths may be about 20 (e.g., N≈20). For example, the predefined distance is set so that about 20 alternative paths are generated. Generating other numbers of alternative paths may also be useful. For example, the number of alternative paths generated may depend on the predefined lateral distance. A larger lateral distance will produce a greater value of N while a smaller lateral distance will produce a lesser value of N. The greater the value of N is, the closer the approach is to being probabilistic complete. However, too large a value for N may negatively impact the throughput of the reactive path planner.

The nominal path serves as a reference for the alternative paths with a lateral deviation. The lateral deviation, for example, is within the predefined lateral distance. In a free environment, the nominal path $P(x)$ should be collision-free. For example, the nominal path $P(x)$ should be able to lead the ego vehicle to its goal or destination location B. For example, the nominal path is validated. However, in a cluttered and dynamic environment, obstacles, such as road construction road detours, traffic jams as well other types of obstacles, may prevent the ego vehicle to attain the required position or even endanger the safety of passengers.

The reactive path planner, in one embodiment, is based on constrained quintic polynomials. For example, alternative trajectories are randomly generated based on the nominal path $P(x)$. The trajectories are generated considering the dynamic and mechanical feasibility of the vehicle, such as rate of curvature, jerk and vehicle size. The trajectories, including the nominal path, are selected according to a cost function. In one embodiment, the cost function is a weighted cost function. Higher weights are given to, in one embodiment, rate of curvature, jerk and distance to obstacles along the path as well as other factors related to road safety. The trajectory with the lowest cost is selected as the selected path. For example, the nominal path or the alternative path with the lowest cost is selected. The cost function ensures that the selected path is feasible since non-feasible paths will have too high of a cost due to the cost function. For example, cost of a path may not exceed a threshold cost $C_{th}$, above which it is deemed unfeasible.

As discussed, the reactive path planner is based on quintic polynomials. As such, an alternative path is based on quintic polynomials. For example, an alternative path $P_i(x)$, wherein i is from 1 to N (the number of alternative paths in the path set), can be expressed as:

$$P_i(x) = P(x) + L_i(x) \text{ for } x_0 \leq x \leq x_f, \text{ and}$$

$$P_i(x) = P(x) + \Delta_i(x) \text{ for } x > x_f$$

where,
- $L_i(x)$ is a transition path from the nominal path to the alternative path,
- $x_0$=the initial point of $L_i(x)$,
- $x_f$—the final point of $L_i(x)$, and
- $\Delta_i(x)$ represents the lateral distance from $P(x)$ to $Pi(x)$.

The transition of each alternative path is generated based on quintic polynomials. In one embodiment, N alternative transition paths are generated from the N alternative paths of the initial alternative path set based on quintic polynomials. The quintic polynomials, in one embodiment, are constrained by dynamic and mechanical constraints. In one embodiment, the constraints include maximum curvature of the trajectory, the maximum steering rate, speed, and length of the vehicle to guarantee the feasibility of the path. The various constraints take into consideration motion, mechanical, safety and comfort requirements. Other types of constraints may also be applied. This produces a constrained alternative path set with N alternative paths, each with a constrained transition path.

In one embodiment, the paths, including the nominal path, are evaluated based on a cost function. In one embodiment, the cost function is a weighted cost function. The weighted cost function is based on various factors. For example, factors include free travel distance (distance assuming free space), lateral acceleration and jerk, deviation distance from the nominal path, lateral distance to an obstacle, lateral distance to curb, lateral distance with respect to the previously selected path and time difference travelling along the alternative path versus the nominal path. Other factors may also be considered in the cost function.

As discussed, the cost function is a weighted cost function. Costs which are weighted higher may include those factors related to safety based on mechanical limitations of ego vehicle. For example, such factors may include lateral acceleration, jerk and the distance to obstacles. The path with the lowest cost is selected as the selected path for the vehicle to proceed to destination B. Depending on the mode, the AV stack may instruct the vehicle control system to drive the vehicle along the selected path to destination B.

As described, the paths are analyzed using a weighted cost function. Based on the cost function, paths which are unfeasible will have too high a cost to be selected. This ensures that only paths which are feasible are selected. In the event there are no feasible paths, the previous optimal path may be maintained. For example, the nominal path may be maintained or, if the vehicle is already travelling on a path, the previously selected path is maintained. As such, the current reactive path planner is a dynamic path planner which is used while the ego vehicle is travelling from location A to location B. For example, evaluation can be performed as the vehicle is travelling. The start location becomes the current location while the end location B remains the same. Furthermore, the nominal path may be the path which the vehicle is currently travelling (e.g., previously selected path).

In other embodiments, the reactive path planner may have a separate validation process, which validates paths based on a maximum curvature according to the constraints, such as lateral motion and steering capability of the ego vehicle based on the ego vehicle's speed and geometry. Alternative paths or transition to alternative paths which exceeds the constraint limits are eliminated as being unfeasible. A cost function is then applied to the validated paths. The validated path, including the nominal path, with the lowest cost is selected as the selected path.

Figure 1B:
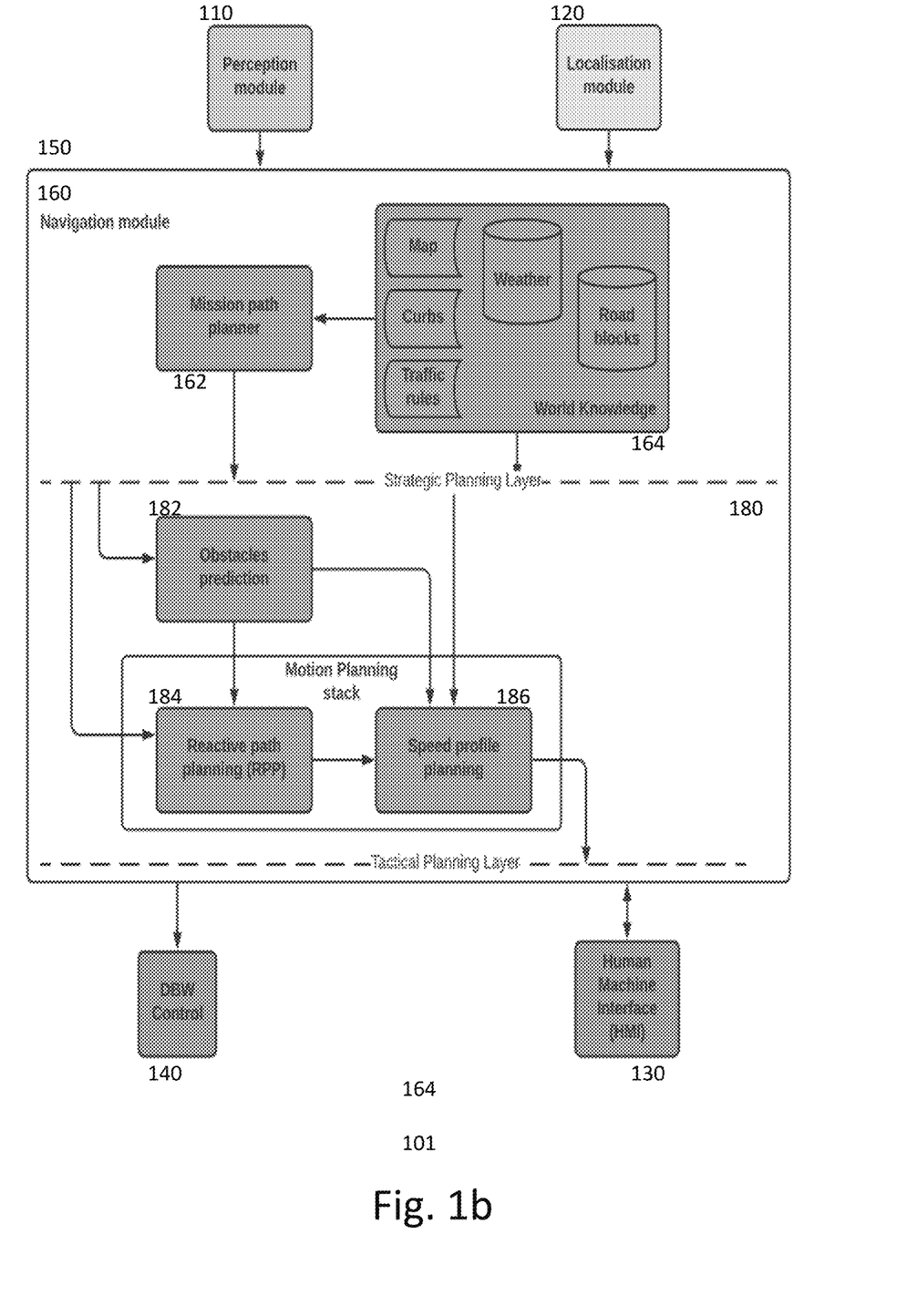
FIG. 1b illustrates an exemplary AV stack.

FIG. 1b illustrates an exemplary embodiment of a navigation system 101. The navigation system, for example, is part of the AV stack of a vehicle. The system, as shown, includes a perception module 110, a localization module 120, a drive-by-wire (DBW) module 130, a human-to-machine (HM) interface module 140 and a navigation module 150. Providing the system with other modules may also be useful.

In one embodiment, the perception module and localization module may serve as input modules. The perception module provides information of the vehicle's surrounding through sensors of the perception module. Such sensors, for example, may include Lidar, radar and/or cameras. Data from other types of sensors may also be useful. The localization module provides information of the vehicle, such as pose, velocity, acceleration and angular rate. Providing other types of vehicle information by the localization module may also be useful.

The HM interface module, for example, serves as an input and output module of the system. For example, the interface unit receives the input from the driver of the destination address. The input may be provided using voice or text input. The HM interface may also include a display for displaying the progress of the trip, for example, from destination A to destination B.

In one embodiment, the DBW module serves as an output module. The DBW module, for example, employs electrical or electromechanical linkages to enable control of vehicle functions, such as steering, braking, accelerator as well as other vehicle components. For example, the output of the navigation module provided to the DBW module for controlling the vehicle, such as when in fully autonomous mode.

In one embodiment, the navigation module includes a strategic planning layer 160 and a tactical planning layer 180. In one embodiment, the strategic planning layer includes a mission planner 162 and an information source 164. The information source, for example, includes various sources to provide current information, such as map information, road or curb information, traffic information, including traffic volume and road speed limits, weather conditions and road constructions, including roadblocks and road detours. The information of the information source is provided to the mission planner as well as to the tactical planning layer. In one embodiment, the mission planner generates a reference or nominal path based on the input destination from the user. The nominal path is presumed to be feasible based on information from the information source.

As for the tactical planning layer, it includes an obstacle predictor 182, a reactive path planner 184 and a speed profile planner 186. In one embodiment, information from the perception module, localization module and information source is provided to the tactical planner. Based on the information provided, the obstacle predictor and reactive path planner and speed profile planner. The reactive path planner generates alternative paths based on the nominal path within a predefined lateral distance. As discussed, the reactive path planner is based on constrained quintic polynomials. The constraints are based on information from the obstacle predictor and information source. Information from the obstacle predictor and speed profile planner are used to apply a cost function to the paths. The path with the least cost is selected as the selected path for output by the navigation module.

Figure 2:
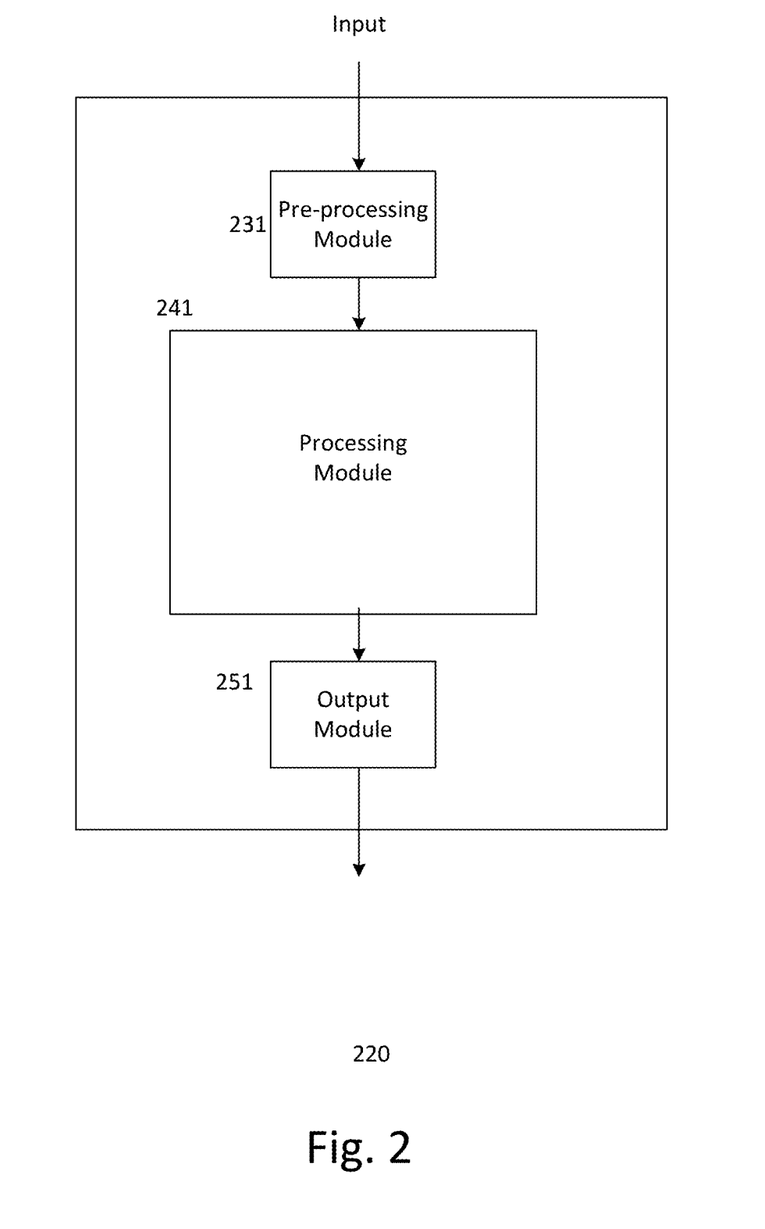
FIG. 2 shows a simplified block diagram of a path planner.

FIG. 2 shows a simplified block diagram of an embodiment of the reactive path planner 220. The reactive path planner, in one embodiment, is based on constrained quintic polynomials. As shown, the reactive planner includes a pre-processing module 231, a processing module 241 and an output module 251. Providing the reactive path planner with other modules may also be useful.

In one embodiment, the pre-processing module receives input data from the vehicle. Input data includes, for example, the nominal path generated based on input from the user. For example, the nominal path P(x) is from location A or the current ego position to location B, the destination. In addition, the input data may include the current speed of the vehicle (ego velocity) as well as other information. Providing the pre-processing module with other types of input data may also be useful.

The pre-processor is configured to preprocess the input data. In one embodiment, the nominal path is converted to Frenet coordinates. The ego location is processed to compute initial conditions. The initial conditions, for example, include initial lateral deviation, initial slope and initial curvature of the ego path at the ego position with respect to the nominal path. In one embodiment, the initial lateral deviation, initial slope and initial curvature of the ego path of the quintic polynomial of the nominal path are determined at location A (e.g., position 0 of the quintic polynomial). For example, the preprocessor generates preprocessed information, which includes Frenet coordinates of the nominal path and initial conditions.

The processing module processes the preprocessed information from the preprocessor. In one embodiment, the processor performs various tasks, including generating alternative paths based on a predefined lateral distance. For example, alternative paths are generated. The alternative paths are parallel paths to the nominal path which are within a predefined lateral distance.

As discussed, the alternative paths, including transitions from the nominal path, are based on constrained quintic polynomials. In one embodiment, the alternative paths, including transitions, are constrained by dynamic and mechanical constraints, such as the maximum curvature of the trajectory, the maximum steering rate, speed, and length of the vehicle.

In one embodiment, the alternative paths are checked for collision risk. For example, the alternative paths are checked to ensure that they are collision-free based on the vehicle's capabilities. For example, constraints such as rate of curvature (mean curvature), lateral acceleration based on the ego vehicle's speed or velocity and lateral distance to an obstacle are considered. In addition, other constraints or factors may also be considered. These other constraints may include maximum curvature, lateral distance to previous optimum path, and lateral distance to nominal path.

The paths, including the nominal path, are evaluated using a weighted cost function. For example, constraints or factors are assigned a weight based on the importance of the factors. Applying the cost function, the processing module selects a selected path to output. The path with the lowest cost is selected as the selected path. The weighted cost function ensures that unfeasible paths are not selected. In one embodiment, for a path to be feasible, the cost must be below a threshold cost. A cost which is greater than the minimum threshold cost is deemed unfeasible and not considered. In the event there are no feasible paths, the previous optimal path may be maintained. For example, the nominal path may be maintained or, if the vehicle is already travelling on a path, the previously selected path is maintained.

As described, the reactive path planner is based on sampling. However, the sampling is limited due to the maximum lateral distance requirement and further limited due to the cost function. The selected path based on the cost function should be the feasible path, e.g., collision-free. The reactive path planner achieves a complete path planning solution with high computational efficiency, even in highly cluttered and dynamic environments.

Figure 3:
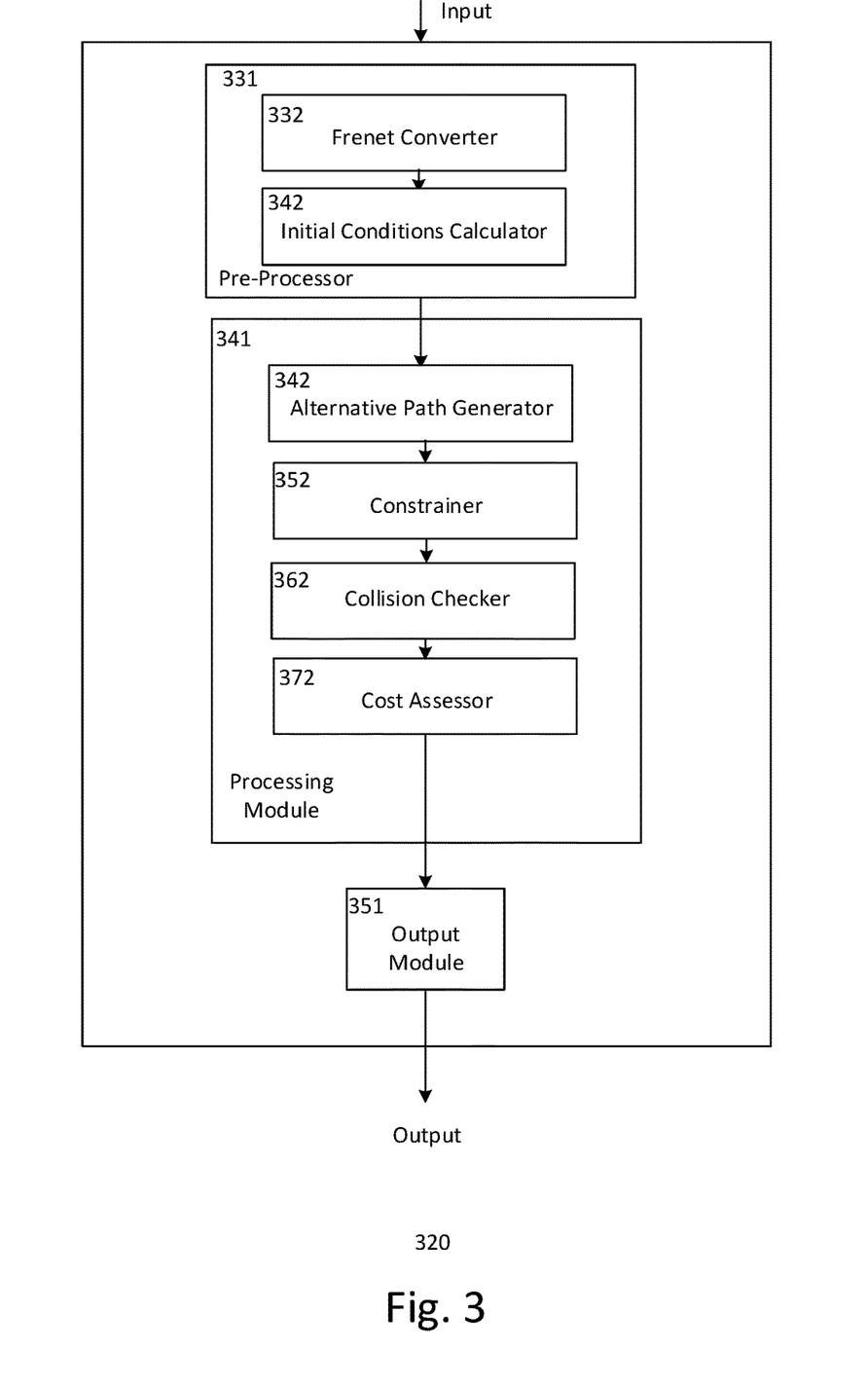
FIG. 3 shows a block diagram of a path planner in greater detail.

FIG. 3 shows an embodiment of the reactive path planner 320 in greater detail. For example, the path planner in FIG. 2 is shown in greater detail. Common elements may not be described or described in detail. The reactive planner, in one embodiment, employs constrained quintic polynomials technique to provide a complete path solution from the ego location (location A) to the destination (location B). For example, the reactive path planner is a sampling-based path planner. As shown, the reactive planner includes a pre-processing module 331, a processing module 341 and an output module 351. Providing the reactive path planner with other modules may also be useful.

The reactive path planner is based on various modeling assumptions. For example, the ego vehicle is assumed to travel along a reference path that can be expressed as a parametric polynomial of x. Also, the ego vehicle lateral motion or heading rate, assuming small slip angles and small steering angles, can be approximated as:

$$\dot{\psi}_{ego} = \frac{\partial \psi_{ego}}{\partial t} = \frac{v_{ego}\delta_{steer}}{L},$$

where,
  $v_{ego}$ is the ego vehicle's speed, $\delta_{steer}$ is the angle of the steering wheels, and
  L represents the vehicle's wheelbase.

Also, the ego vehicle lateral motion or heading rate can be approximated as, assuming small slip angles and small steering angles:

$$\dot{\psi}_{ego} = \frac{\partial \psi_{ego}}{\partial t} = \frac{v_{ego}\delta_{steer}}{L}.$$

In addition, the curvature K (x) of the quintic polynomial $L_i(x)$ can be expressed as:

$$K(x) \le \frac{\partial^2 L_i(x)}{\partial x^2} = L_i(x)''$$

where,
- x is the distance traveled along the nominal path or arc length, and
- Li(x)" is the second derivative of the quintic polynomial of the transition path expressed as a function of the distance traveled from the nominal path to the alternative path. Also, the speed of the ego vehicle is assumed to remain relatively constant during the transition maneuver. In the case that the ego vehicle velocity is zero, the system assumes a minimum ego velocity, based on the vehicle's dynamic and mechanical constraints.

Input is provided to the reactive path planner. In one embodiment, input is preprocessed by the preprocessing module. The preprocessing module, as shown, includes a Frenet converter unit 331 and an initial conditions calculator unit 342. Providing other units for the preprocessing module may also be useful.

The nominal path is provided to the Frenet converter which converts it to Frenet coordinate system. The ego location is provided to the initial conditions calculator. As for the initial calculator, it calculates the initial conditions, which in one embodiment, include initial lateral deviation $d_0$, initial slope $s_0$ and initial curvature of the ego path $k_0$. The initial lateral deviation is calculated from P(x) for $x_0$ (current ego location), the initial slope is calculated from P'(x) for $x_0$ and the initial curvature is calculated from P''(x) for $x_0$. Assuming the ego vehicle is travelling along the nominal path, the initial conditions $d_0$, $s_0$ and $k_0$ are equal to 0.

In one embodiment, the processing module is configured to process the nominal path and generate alternative paths which are constrained. The paths, including the nominal path, are evaluated using a cost function. The path with the lowest cost is selected as the output path for the ego vehicle to use.

In one embodiment, the alternative path generator unit generates alternative paths based on the nominal path. In one embodiment, the alternative paths are expressed as quintic polynomials $P_i(x)$, where i is from 1 to N.

An arc length-parametrized quintic polynomial of a path yields a motion. The motion can include a jerk. It is preferable that the jerk is minimal to produce a comfortable ride for the passenger as well as avoid hitting obstacles. Since alternative paths are parallel to the nominal paths, they are also assumed to be feasible. However, the transition paths from the nominal path to the alternative paths may not be. For example, each alternative path will include a transition path from the nominal path to the alternative path and needs to be evaluated.

A transition quintic polynomial of an alternative trajectory can be expressed as $L_i(x)$. To exploit the properties of quintic polynomials, we determine the relationship between the initial and final conditions of the transition quintic polynomial $L_i(x)$ with the coefficients $\vec{a} = [a_0, a_1, a_2, a_3, a4, \text{ and } a_5]$. The transition path, in one embodiment, is expressed as an arc length-parametrized quintic polynomial $L_i(x)$ as follows:

$$L_i(x) = a_0 + a_1 x + a_2 x^2 + a_3 x^3 + a_4 x^4 + a_5 x^5 \quad \text{(equation 1)}.$$

The polynomial function (equation 1) determines the lateral deviation $d_x$. A first derivative of equation 1 is as follows:

$$L_i'(x) = a_1 + 2a_2 x + 3a_3 x^2 + 4a_4 x^3 + 5a_5 x^4 \quad \text{(equation 2)}.$$

The derivative of the polynomial function (equation 1) determines the slope $s_x$.

A second derivative of equation 1 is as follows:

$$L_i''(x) = 2a_2 + 6a_3 x + 12a_4 x^2 + 20a_5 x^3 \quad \text{(equation 3)}.$$

The second derivative of the polynomial function (equation 1) determines the slope $k_x$.

The relationship of the initial and final conditions of the quintic polynomial are determined. Since the initial conditions are with respect to the nominal path P(x), then $L_i(x_0) = d_0$, $L_i'(x_0) = s_0$ and $L_i''(x_0) = k_0$. Furthermore, the final conditions are $L_i(x_f) = d_f$, $L_i'(x_f) = s_0 = 0$ and $L_i''(x_f) = k_0 = 0$. This is because the alternative paths run parallel to the nominal path after the transition maneuver is completed. Accordingly, the coefficients $a_0$-$a_5$ can be calculated. The coefficients are as follows:

$$a_0 = d_0;$$

$$a_1 = s_0;$$

$$a_2 = k_0/2;$$

$$a_3 = (20\Delta d - 12 s_0 x_f - 3 k_0 x_f^2)/2 x_f^3;$$

$$a_4 = (-30\Delta d - 16 s_0 x_f + 3 k_0 x_f^2)/2 x_f^4; \text{ and}$$

$$a_5 = (12\Delta d - 6 s_0 x_f - 3 k_0 x_f^2)/2 x_f^5,$$

where,
- $\Delta d = d_f - d_0$, which is the lateral position difference between the initial and final points of the transition quintic polynomial $L_i(x)$.

As such, the only unknown variable is $x_f$, which is the distance traveled along the nominal path necessary to reach the alternative path P(x). In other words, it is the arc-length distance of the transition polynomial $L_i(x)$.

In one embodiment, the constrainer unit solves the quintic polynomials of the alternative paths taking into consideration, in one embodiment, safety and performance constraints as well as the passengers' comfort level. In one embodiment, the curvature of the path is constrained according to the maximum steering capability of the ego vehicle.

As discussed, the ego vehicle lateral motion or heading rate can be approximated as $$\dot{\psi}_{ego} = \frac{\partial \psi_{ego}}{\partial t} = \frac{v_{ego} \delta_{steer}}{L}.$$

The curvature of the transition path $L_i(x)$ can be expressed as follows:

$$\dot{\psi}_{ref} = \frac{v_{ego} \delta_{steer}}{L} \approx \frac{\partial \mathbb{L}_i'(x)}{\partial t} = \quad \text{(equation 4)}$$

$$\mathbb{L}_i''(x) \frac{\partial x}{\partial t} = \mathbb{L}_i''(x) v_{ego} \cos(\mathbb{L}_i'(x)) \leq \mathbb{L}_i''(x) v_{ego}.$$

Equation 4 can be constrained by the maximum steering capability of the vehicle as follows:

$$\delta_{steer} \leq L_i(x)'' L \leq \delta_{steer} \quad \text{(equation 5)},$$

where,
- $\delta_{steer}^{max}$ = maximum steering capability of the vehicle,
- $\delta_{steer}$ = angle of steering, and
- L = vehicle's wheelbase.

In one embodiment, the alternative path generator unit generates alternative paths based on the constrained quintic polynomial. In addition, to guarantee passengers' comfort, a maximum lateral acceleration $a_\kappa^{max}$ limits the maximum curvature of the transition quintic polynomial. In one embodiment, the maximum curvature of the path complies with the following constraint:

$$L_i''(x) < \min\left\{\frac{\alpha_\kappa^{max}}{v_{ego}^2}, \frac{\delta_{steer}^{max}}{L}\right\}. \quad \text{(equation 6)}$$

The rate of curvature of Li(x) can be bounded by the ego vehicle's speed and maximum steering rate as well as the maximum allowed lateral jerk using the derivative of equation 6. The derivative of equation 6 is as follows:

$$L_i'''(x) = \alpha_0 + \alpha_1 x + \alpha_2 x^2 < \min\left\{\frac{j_\kappa^{max}}{v_{ego}^3}, \frac{\delta_{steer}^{max}}{v_{ego}L}\right\}, \quad \text{(equation 7)}$$

where, $$\alpha_0 = \frac{60\Delta d}{x_f^3} - \frac{36s_0}{x_f^2} - \frac{9\kappa_0}{x_f},$$

$$\alpha_1 = \frac{-360\Delta d}{x_f^4} + \frac{192s_0}{x_f^3} + \frac{36\kappa_0}{x_f^2}, \text{ and}$$

$$\alpha_2 = \frac{360\Delta d}{x_f^5} - \frac{180s_0}{x_f^4} - \frac{30\kappa_0}{x_f^3}.$$

where,

The extrema of L'''(x) occurs at x–{0, $x_f/2$, $x_f$}. The extrema of L''' produces:

For $x = 0$ (equation 8)

$$\frac{60\Delta d}{x_{f0}^3} - \frac{36s_0}{x_{f0}^2} - \frac{9\kappa_0}{x_{f0}} < \min\left\{\frac{j_\kappa^{max}}{v_{ego}^3}, \frac{\delta_{steer}^{max}}{v_{ego}L}\right\};$$

For $x = x_{f1}/2$ (equation 9)

$$\frac{-30\Delta d}{x_{f1}^3} + \frac{15s_0}{x_{f1}^2} + \frac{3\kappa_0}{2x_{f1}} < \min\left\{\frac{j_\kappa^{max}}{v_{ego}^3}, \frac{\delta_{steer}^{max}}{v_{ego}L}\right\}; \text{ and}$$

For $x = x_{f2}$ (equation 10)

$$\frac{60\Delta d}{x_{f2}^3} - \frac{24s_0}{x_{f2}^2} - \frac{3\kappa_0}{x_{f2}} < \min\left\{\frac{j_\kappa^{max}}{v_{ego}^3}, \frac{\delta_{steer}^{max}}{v_{ego}L}\right\}.$$

The constrained paths form a set of constrained alternative path set.

The constraints of the paths can be calculated. In one embodiment, the maximum curvature Validation, in one embodiment, the maximum curvature of $L_i(x)$ of each alternative path can be calculated by choosing $x_f = \max(xf_0, xf_1, xf_2)$. $X_f$ are points of interest where motion constraints could be violated. The maximum curvature points along the x-axis are denoted by $x^1_k$ and $x^2_k$. The maximum curvature points can be calculated by finding the roots of $L_i(x)''=0$, which is the curvature of the path $L_i$ along the x axis. If $L_i''(x^1_k)$ (maxima of the polynomial) and $L_i(x^2_k)''$ (minima of the polynomial) comply with equation 6, the transition polynomial $L_i(x)$ is feasible. Otherwise, the transition polynomial $L_i(x)$ is not feasible. In some instances, xf may not be enough to guarantee that the polynomial complies with the motion constraints. This may require executing the transition maneuver over a longer distance to ensure a smooth transition.

The cost assessor unit applies a cost function to the paths, including the nominal path. The cost function, for example, can be expressed as follows:

$$C(L(s,d_f-d_{lat}))=\lambda_1 C_1+\lambda_x C_x,$$

where,
 $\lambda_1$=value of first cost factor,
 $C_1$=value of first cost weight,
 $\lambda_x$=value of the x or last cost factor, and
 $C_x$=value of the x or last cost weight.

The path with the lowest cost is selected as the path for output to, for example, the controller framework of the ego vehicle. In one embodiment, a cost threshold is defined $C_{th}$. The cost threshold is the upper cost value of the path. If a path exceeds $C_{th}$, then the path is unfeasible.

Figure 4:
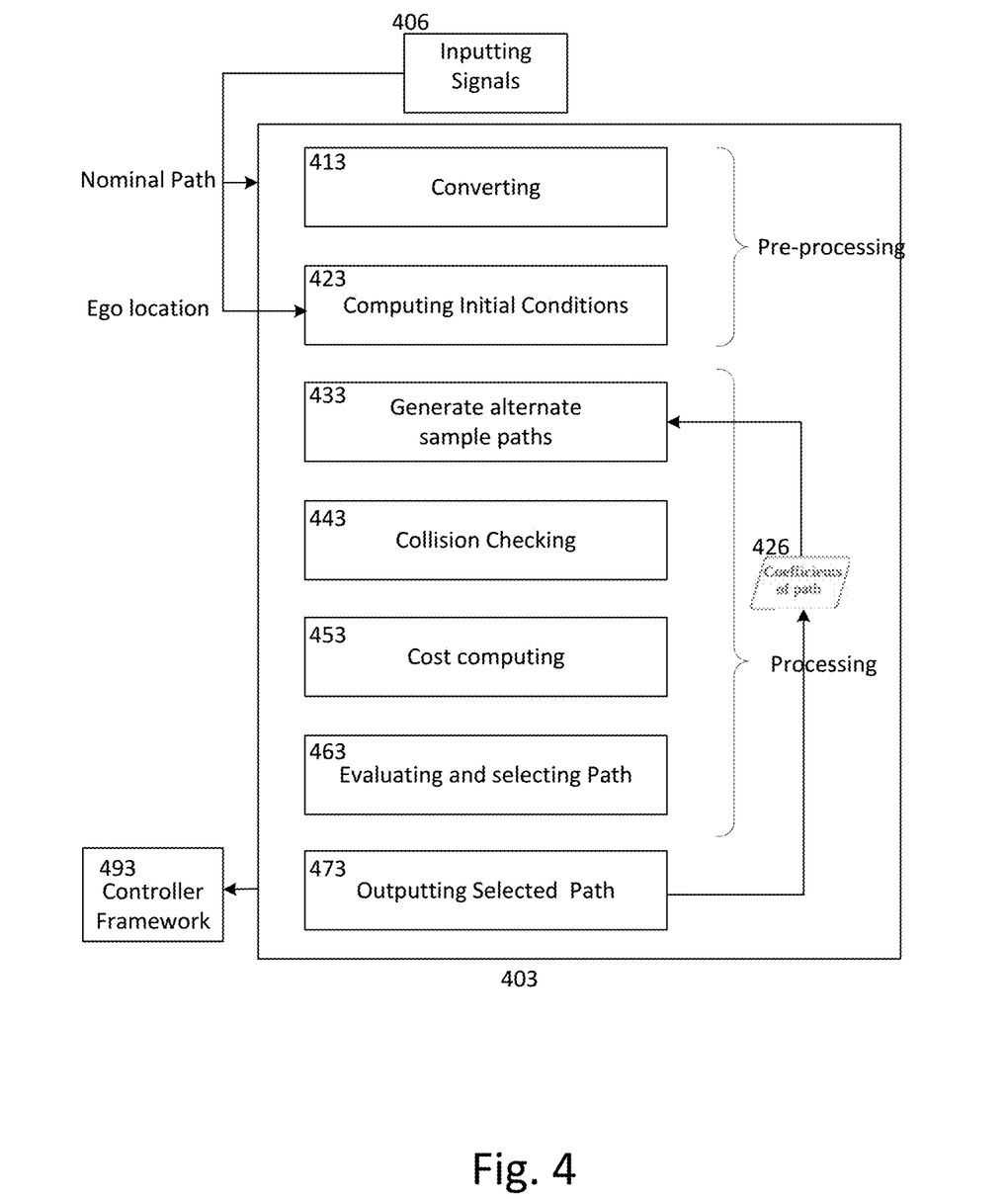
FIG. 4 shows a simplified process flow of an embodiment of a path planner.

FIG. 4 shows a simplified process flow 400 of an embodiment of a path planner. At 406, input signals are provided to the reactive path planner. For example, input signals are provided to the preprocessing module of the reactive path planner. The input signal, for example, includes a nominal path generated by the mission path planner. In addition, the input signal may also include initial information of the ego vehicle, such as the ego vehicle's location.

In one embodiment, the nominal path is converted to Frenet coordinates at 413. At 423, initial conditions are determined based on the ego location. The initial conditions, for example, include initial lateral deviation, initial slope and initial curvature of the ego path at the ego position. In one embodiment, the initial lateral deviation, initial slope and initial curvature of the ego path of the quintic polynomial of the nominal path are determined at location A (e.g., position 0 of the quintic polynomial).

After preprocessing, at 433, the reactive path planner generates alternative sample paths. The alternative sample paths, for example, are parallel paths to the nominal path and as well as being within a predefined lateral distance of the nominal path. As discussed, the reactive path planner is based on constrained quintic polynomials.

At 443, the reactive path planner performs collision checking. For example, constraints are calculated based on vehicles for the alternative paths, including transitions. For example, dynamic and mechanical constraints are calculated, such as the quintic polynomial, in one embodiment, such as the maximum curvature of the trajectory based on the maximum steering rate, speed, and length of the vehicle. This includes generating the coefficients for the quintic polynomials at 426.

At 453, cost computing is performed on the paths. For example, a cost function is applied to the paths. At 463, the path planner evaluates the paths with the cost function. The path with the lowest cost function is selected as the selected path. At 473, the path planner outputs the selected path. For example, the selected path is provided at 493 to the vehicle controller framework.

Figure 5:
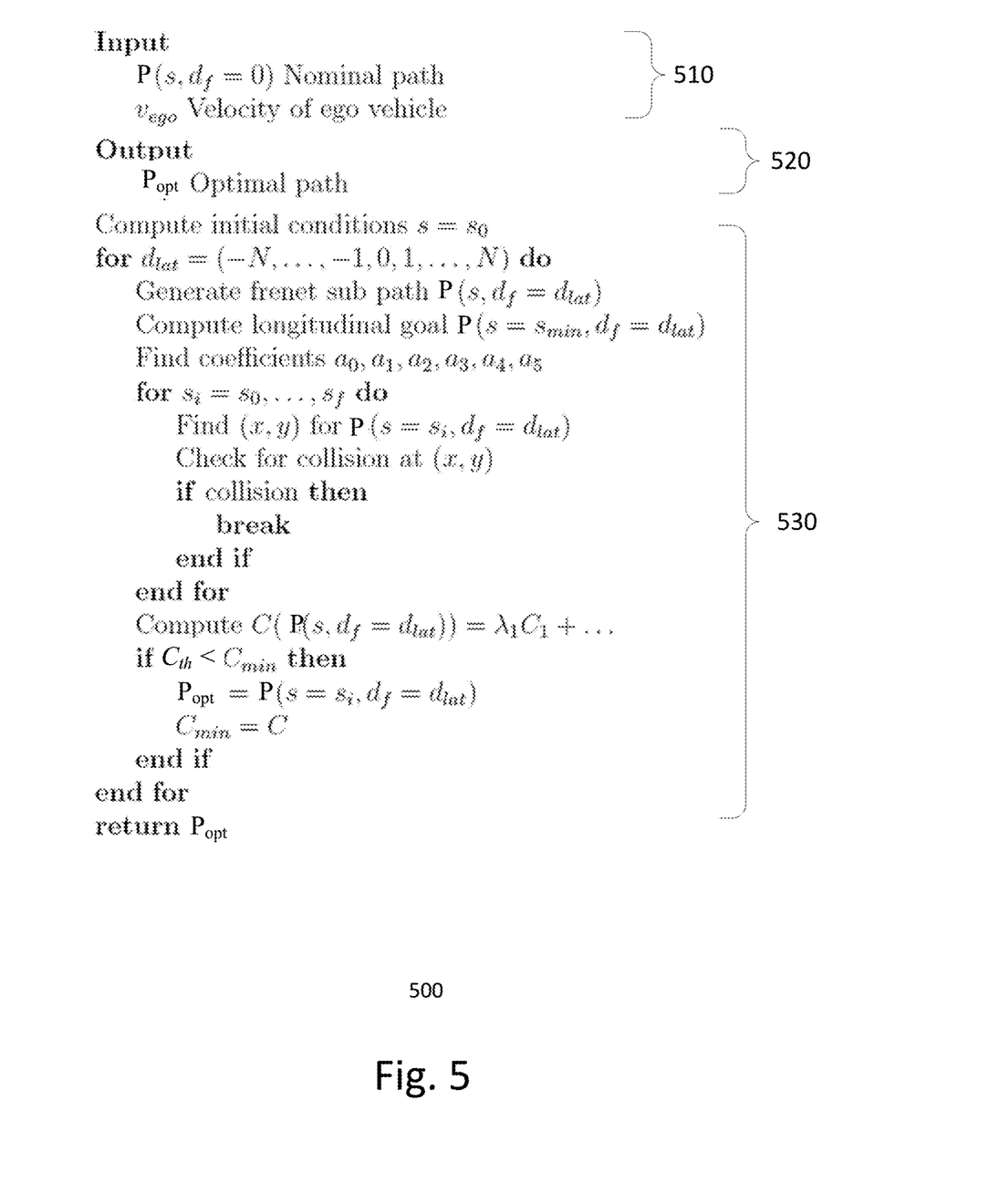
FIG. 5 shows an exemplary pseudo code for implementing a reactive path planner.

FIG. 5 shows an exemplary pseudo code 500 for implementing a reactive path planner. As shown, the pseudo code includes an input section 510, an output section 520 and a processing section 530.

In one embodiment, the input section is configured to receive the nominal path P(x) and ego velocity as the input. The nominal path, for example, is generated by the mission planner. The processing section processes the input to determine initial conditions, generate alternative parallel paths $P_i(x)$ of the nominal path within a predefined lateral distance and (longitudinal goal), perform collision checking, assign a cost factor to the constraints and select the path with the minimum cost $C_{min}$. In one embodiment, if $C_{min}$ is less than a threshold cost $C_{th}$, then the path with the minimum cost is selected as the optimum path $P_{opt}$. The output section outputs the optimum path $P_{opt}$.

As described, the pseudo code analyzes the nominal P(x) and alternative paths $P_i(x)$, which include transition paths from the nominal path to the alternative paths, for collision checking. In alternative embodiments, collision checking can be performed only on the transition paths. For example, since the nominal path is feasible and the alternative paths are parallel, the alternative paths are also feasible. What is left is the transition paths. For example, constraints related to mean curvature, maximum curvature and lateral acceleration may be performed on the transition paths. However, the constraint related to distance to the obstacle is performed on the whole path. Other collision checking and cost calculation configurations may also be useful.

Figure 6:
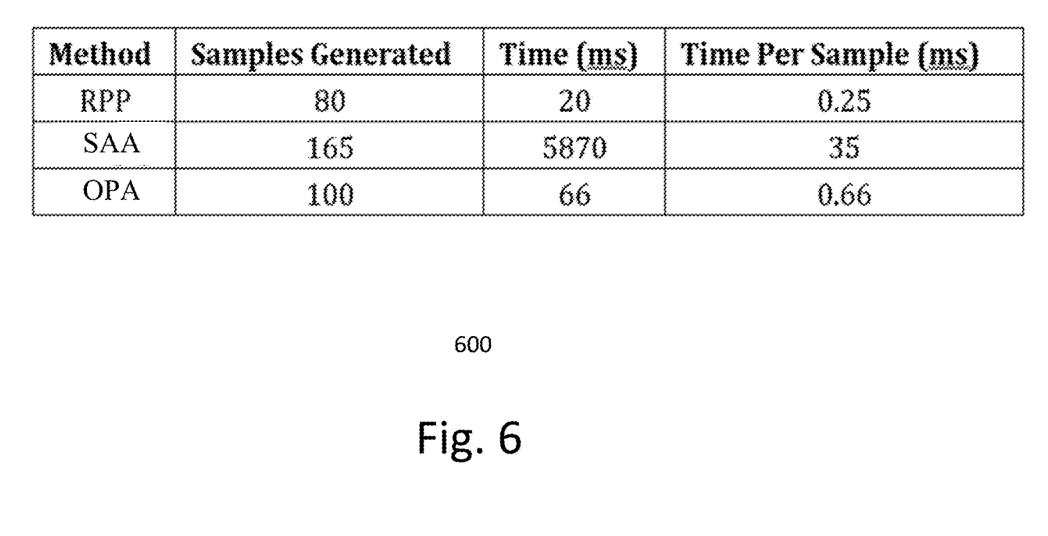
FIG. 6 is a table comparing the performance of the present reactive path planner versus conventional path planning techniques.

FIG. 6 is a table 600 comparing the performance of the present reactive path planner versus alternative sampling-based techniques. In particular, the reactive path planning (RPP) is compared with simulated anneal algorithm (SAA) and open planner algorithm (PMP) techniques. The table compares the number of samples generated by each technique, the overall time to perform the sampling for each technique and the calculation time per sample and the time per sample for each technique. As illustrated, RPP generates lesser samples, has the fastest overall sampling time and fastest per sample time.

Figure 7A:
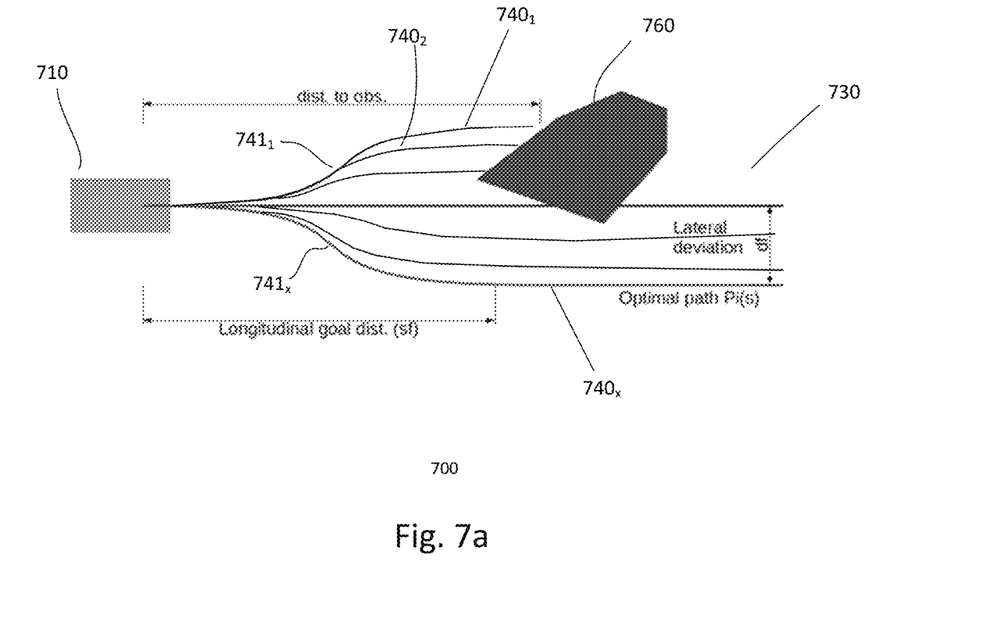
FIGS. 7a-7b illustrates an example of a cost function.

FIG. 7a illustrates an example 700 of applying a cost function to different constraints for selecting a path. As shown, an ego vehicle 710 is shown travelling along a path from A to B. A nominal path P(x) 730 is generated by, for example, the mission planner. Based on the nominal path, a plurality of alternative $L_i(x)$ paths $740_{1-x}$ are generated by the reactive path planner based on constrained quintic polynomials. For example, x number of alternative paths are generated within a predefined lateral distance of the nominal path and which are parallel to the nominal path. Each alternative path includes a transition path from the nominal path to the alternative path. For example, transition paths $741_{1-x}$ are included for the alternative paths $740_{1-x}$. As shown, an obstacle 760 exists along the nominal path and some of the alternative paths.

Figure 7B:
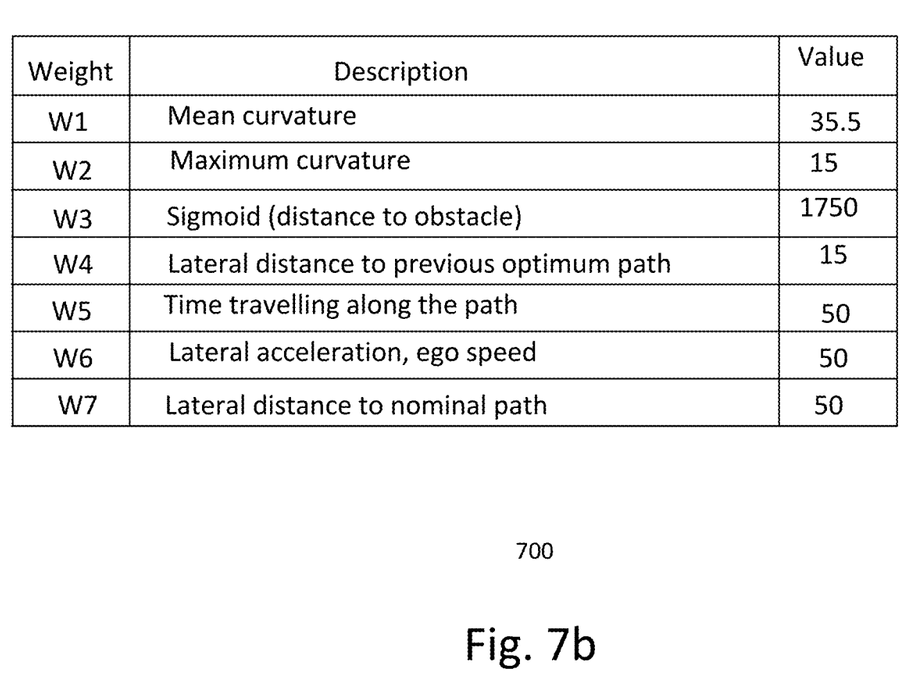

In one embodiment, a weighted cost function is employed to the paths. In one embodiment, the cost function considers 7 factors, each with a weight. The weights of the different factors are listed in FIG. 7b. Different weight values are assigned to the different factors. Higher weights are assigned for safety factors. In addition, distance to the obstacle is assigned the highest fact. In such instances, the presence of an obstacle in a path would significantly increase its cost. Providing a cost function with other factors or assigned weight values may also be useful. As shown, alternative path $740_x$ is selected since it has the lowest cost and the cost is below a threshold cost $C_{th}$.

The present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. A path planning system for a vehicle comprising:
a reactive path planner module, the reactive path planner is based on constrained quintic polynomials, the reactive planner is configured to generate N alternative paths based on a nominal path from location A to location B, the N alternative paths are parallel paths to the nominal path and are displaced within a predefined lateral distance from the nominal path;
a constrainer module, the constrainer constrains the alternative paths based on constrained quintic polynomials, and wherein constraints
  ensure safety and comfort of the vehicle based on dynamic and mechanical capabilities of the vehicle, and
comprises
  longitudinal distance to an obstacle,
  mean curvature,
  maximum curvature,
  lateral acceleration based on vehicle speed;
  time travelling on a path,
  lateral distance of a path to the nominal path, or
  a combination thereof; and
an evaluator module, the evaluator module applies a cost function to the nominal path and alternative paths and selects one of the paths from the nominal path and alternative paths with a lowest cost from the cost function as an output path of the planning system wherein
  longitudinal distance to an obstacle is assigned a highest weight value of the cost function,
  mean curvature, time travelling along the path, lateral acceleration and lateral distance to the nominal path constraints are assigned higher weight values of the cost function, and
  maximum curvature and lateral distance to previous optimum path are assigned lower weight values of the cost function.

2. The system of claim 1 comprises a Frenet converter, the Frenet converter converts the nominal path to Frenet coordinates.

3. The system of claim 1 wherein constraints related to safety are assigned higher weight values for the cost function.

4. The system of claim 1 wherein the path with the lowest cost from the nominal path and alternative paths is the output path of the planning system if the cost is below a threshold cost.

5. The system of claim 1 wherein:
paths with cost below a threshold cost are feasible paths; and
paths with cost at or above the threshold cost are not feasible paths.

6. A method for path planning in a vehicle comprising:
generating N alternative paths based on a nominal path from location A to location B, the N alternative paths are parallel paths to the nominal path and are displaced within a predefined lateral distance from the nominal path;
calculating constraints on the alternative path based on constrained quintic polynomials, wherein constraints are based on the vehicle dynamic and mechanical capabilities, wherein the constraints comprise
  longitudinal distance to an obstacle,
  mean curvature,
  maximum curvature,
  lateral acceleration based on vehicle speed, time travelling on a path,
lateral distance of a path to the nominal path, or
a combination thereof; and
evaluating the nominal path and alternative paths using a cost function, wherein a path with a lowest cost according to the cost function is selected as an output path, wherein
longitudinal distance to an obstacle is assigned a highest weight value of the cost function,
mean curvature, time travelling along the path, lateral acceleration and lateral distance to the nominal path constraints are assigned higher weight values of the cost function, and
maximum curvature and lateral distance to previous optimum path are assigned lower weight values of the cost function.

7. The method of claim 6 comprises converting the nominal path to Frenet coordinates before generating alternative paths.

8. The method of claim 6 wherein constraints related to safety are assigned higher weight values for the cost function.

9. The method of claim 6 wherein the path with the lowest cost from the nominal path and alternative paths is the output path of the planning system if the cost is below a threshold cost.

10. A path planning system for a vehicle comprising:
a mission path planner module, the mission path planner generates a nominal path from location A to location B;
a reactive path planner module, the reactive path planner is based on constrained quintic polynomials, the reactive planner is configured to generate N alternative paths based on the nominal path, the N alternative paths are parallel paths to the nominal path and are displaced within a predefined lateral distance from the nominal path;
a constrainer module, the constrainer constrains the alternative paths based on constrained quintic polynomials, wherein constraints are based on the vehicle dynamic and mechanical capabilities; and
an evaluator module, the evaluator module applies a cost function to the nominal path and alternative paths and selects a one of the paths from the nominal path and alternative path with a lowest cost from the cost function as an output path of the planning system, wherein
longitudinal distance to an obstacle is assigned a highest weight value of the cost function,
mean curvature, time travelling along the path, lateral acceleration and lateral distance to the nominal path constraints are assigned higher weight values of the cost function, and
maximum curvature and lateral distance to previous optimum path are assigned lower weight values of the cost function.

11. The system of claim 10 wherein the constraints comprise:
longitudinal distance to an obstacle;
mean curvature;
maximum curvature;
lateral acceleration based on vehicle speed;
time travelling on a path;
lateral distance of a path to the nominal path; or
a combination thereof.

12. The system of claim 10 wherein the path with the lowest cost from the nominal path and alternative paths if the output path of the planning system is the cost is below a threshold cost.

13. The system of claim 10 wherein:
paths with cost below a threshold cost are feasible paths; and
paths with cost at or above the threshold cost are not feasible paths.

14. The system of claim 10 wherein constraints related to safety are assigned higher weight values for the cost function.

15. The system of claim 10 comprises a Frenet converter, the Frenet converter converts the nominal path to Frenet coordinates.

* * * * *